US010659876B2

(12) United States Patent
Teo et al.

(10) Patent No.: US 10,659,876 B2
(45) Date of Patent: May 19, 2020

(54) DISTRIBUTED MICROPHONE ARRAY AND SOUND SOURCE POSITIONING SYSTEM APPLICABLE THERETO

(71) Applicant: Espressif Systems (Shanghai) Pte Ltd, Shanghai (CN)

(72) Inventors: Swee Ann Teo, Shanghai (CN); Rui Zhan, Shanghai (CN)

(73) Assignee: Espressif Systems (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/086,166

(22) PCT Filed: Dec. 30, 2016

(86) PCT No.: PCT/CN2016/113578

§ 371 (c)(1), (2) Date: Sep. 18, 2018

(87) PCT Pub. No.: WO2018/006568

PCT Pub. Date: Jan. 11, 2018

(65) Prior Publication Data

US 2019/0116418 A1 Apr. 18, 2019

(30) Foreign Application Priority Data

Jul. 8, 2016 (CN) .......................... 2016 1 0535135

(51) Int. Cl.
*G06F 17/00* (2019.01)
*H04R 3/00* (2006.01)
(Continued)

(52) U.S. Cl.
CPC ............. *H04R 3/005* (2013.01); *H04R 1/406* (2013.01); *H04R 5/027* (2013.01);
(Continued)

(58) Field of Classification Search
CPC ..................................................... H04R 3/005
See application file for complete search history.

(56) References Cited

U.S. PATENT DOCUMENTS

2015/0286459 A1* 10/2015 Habets ................ G10K 11/346 700/94
2017/0358313 A1* 12/2017 Shih .................... G10L 21/0208
2019/0019295 A1* 1/2019 Lehtiniemi ............... G06T 7/11

FOREIGN PATENT DOCUMENTS

CN 1426047 A 6/2003
CN 103841360 A 6/2014
(Continued)

OTHER PUBLICATIONS

International Search Report for PCT/CN2016/113578 dated Mar. 31, 2017.
(Continued)

*Primary Examiner* — Joseph Saunders, Jr.
(74) *Attorney, Agent, or Firm* — Buchanan Ingersoll & Rooney PC

(57) ABSTRACT

Disclosed is a distributed microphone array. The array comprises: a plurality of distributed microphone array nodes, wherein each microphone array node is provided with one or a plurality of microphone audio acquisition modules; and the microphone array node is connected to an external signal processing unit by means of wireless network communication, and uploads an unprocessed audio signal or an audio signal which has undergone simple signal processing on the array node to the signal processing unit. In the present invention, all the wireless microphone array nodes distributed in a wireless network form a large microphone array. In a wireless microphone array, microphone signal acquisition and transmission are based on a wireless type, and the distribution of microphones is no longer limited by a physical dimension or a cabling connection, so that the
(Continued)

distribution of a significant amount of microphones can be achieved, and the distance between the microphones and the coverage area of the microphone array can be greatly increased.

6 Claims, 3 Drawing Sheets

(51) Int. Cl.
*H04R 5/027* (2006.01)
*H04R 1/40* (2006.01)
*H04S 7/00* (2006.01)

(52) U.S. Cl.
CPC .. *H04R 2201/401* (2013.01); *H04R 2201/405* (2013.01); *H04R 2420/07* (2013.01); *H04S 7/30* (2013.01); *H04S 2400/11* (2013.01); *H04S 2400/15* (2013.01)

(56) References Cited

FOREIGN PATENT DOCUMENTS

| | | | |
|---|---|---|---|
| CN | 105206281 | A | 12/2015 |
| CN | 105376531 | A | 3/2016 |
| CN | 106028227 | A | 10/2016 |
| KR | 101532712 | B1 | 7/2015 |

OTHER PUBLICATIONS

Zhang Hui-Xin, "Sound Source Localization Distributed Microphone Array", Zhang, Hui-xin, Yan, An-bin, Wang, Xin, Jiang Wei, "Sound Source Localization Distributed Microphone Array", China Academic Journal Electronic Publishing House, vol. 41, No. 2, Feb. 2016 (pp. 77-81).

* cited by examiner

DISTRIBUTED MICROPHONE ARRAY AND SOUND SOURCE POSITIONING SYSTEM APPLICABLE THERETO

CROSS REFERENCE TO RELATED APPLICATIONS

This application is the United States national phase under 35 U.S.C. § 371 of PCT International Patent Application No. PCT/CN2016/113578, filed on Dec. 30, 2016, which claims benefit of priority of Chinese Application No. 201610535135.7, filed on Jul. 8, 2016.

TECHNICAL FIELD

The present disclosure relates to a microphone array technology and, in particular, to a distributed microphone array and sound source positioning system having the same.

BACKGROUND

Microphone array technology has important and wide applications in the field of audio signal processing. Within a spatial range in which audio signal acquisition is required, a microphone array is constituted by multiple microphones deployed in different positions.

Compared with traditional audio signal acquisition by a single microphone, a sound pick-up range of the microphone array is much extended. Depending on the size of the microphone array, the pick-up range of the microphone array is extended from less than 0.5 meters of the traditional pick-up by a single microphone to several meters, or even dozens of meters. By use of signals acquired by multiple microphones, specific audio signals can be effectively enhanced in a noise environment so that a good noise suppression effect can be achieved; and a directional sound pick-up operation can be implemented and voices from audio signal sources in specific directions can be acquired; and sound sources can be positioned conveniently.

The mainstream microphone products in the current market include small-sized wired microphone arrays, small-sized wireless microphone arrays (mainly using Wi-Fi access) and suspended microphone arrays.

As shown in FIG. 1, most small-sized microphone arrays are desktop microphone arrays, wherein an audio mixer 101 is integrated with multiple microphones 102 and Wi-Fi device, and has a physical dimension generally less than 0.3 meter. The distances between the microphones 102 are small, and space diversity gains of the audio signal processing are limited; and the mixer 101 output may be connected to a terminal device such as an audio device 103 in a wired or wireless mode.

Proper increase in the distances between microphones may provide higher space diversity gains and a better directional sound pick-up effect due to the long wavelength of audio signals.

As shown in FIG. 2, a suspended microphone array is a microphone array product providing long distances between microphones, wherein microphones 202 suspended on the top 201 of a space (for example, a large meeting place) acquire specific audio signals in the space, the audio signals are inputted into a mixer 203 by specific cables to make signal processing, and then the output signals of the mixer 203 are transmitted into a speaker 205 through a signal line 204, and finally the speaker 205 outputs the acquired audio signals.

The connections between the microphones and the mixer of the mainstream products listed above are all wired. The small-sized integrated mode strongly limits the physical dimension of the microphone array, and thus limits the sound pick-up range and space diversity gains of the microphone array; also, the cable connection mode of the suspended microphone array with long distances between microphones increases the difficulty of microphone deployment, and the limited number of input ports of the mixer also limit the number of the deployed microphones, thereby restraining the physical coverage area of the microphone array in practical application.

SUMMARY

The present disclosure provides a distributed microphone array and a sound source positioning system having the same, which provide a large span of sound pick-up range, higher space diversity gains and a more accurate three-dimensional spatial sound source positioning and achieve directional acquisition of multiple sound sources.

To achieve this, the present disclosure provides a distributed microphone array. The array includes a plurality of microphone array nodes which are deployed in a distributed manner. Each of the plurality of microphone array nodes is provided with one or more microphone audio acquisition modules. The microphone array node is configured to communicatively connect to an external signal processing unit via a wireless network, and upload, an unprocessed audio signal or an audio signal which is simply processed on the microphone array node, to the signal processing unit.

The wireless network adopts 802.11 Wi-Fi communication, Bluetooth communication, Zigbee communication or any wireless network transmission mode.

Each of the plurality of microphone array nodes further includes a wireless device or an Internet of Things device with any application function.

Each of the plurality of microphone array nodes further includes:

a wireless transmission and control module, where an input end of the wireless transmission and control module is communicatively connected to the one or more microphone audio acquisition modules, and the wireless transmission and control module is communicatively connected to the signal processing unit via the wireless network;

a function module, which is communicatively connected to the wireless transmission and control module and is any application function device.

The one or more microphone audio acquisition module and the function module are communicatively connected to the wireless transmission and control module through a data interface; and the data interface adopts UART, SPI, I2S, USB, SDIO, I2C or any standard interface.

The present disclosure also provides a sound source positioning system. The sound source positioning system includes:

the above-mentioned distributed microphone array, which directionally acquires a single sound source or multiple sound sources; and the signal processing unit, which is configured to communicatively connect to the distributed microphone array via a wireless network, receive an unprocessed audio signal uploaded by the distributed microphone array, and perform audio signal processing of audio mixing, noise suppression, echo cancellation or three-dimensional spatial sound source positioning.

The positioning system includes one or more signal processing units connected to the wireless network.

The signal processing unit is an independent device in the wireless network or integrated with an access point (AP) in a Wi-Fi wireless network.

The positioning system further includes an optical monitoring device.

Compared with the microphone array technology in the prior art, the distributed microphone array and sound source positioning system having the same according to the present disclosure has the advantages in that all the wireless microphone array nodes deployed in the wireless network form a large microphone array in the present disclosure. In the wireless microphone array, microphone signal acquisition and transmission are based on a wireless mode, and the distributed deployment of microphones is no longer limited by physical dimensions or cable connections, so that a considerable number of microphones can be deployed and the distances between the microphones as well as the coverage area of the microphone array can be greatly increased.

The deployment of the wireless microphone array nodes is simple and flexible, thereby achieving deployment of a large quantity of microphones with long distances. Also, the spatial positions of the wireless microphone array nodes are diversified, so that the wireless microphone array has a large span of sound pick-up range and abundant acquired signal samples to achieve better echo and noise suppression in the signal processing unit, thereby providing higher space diversity gains and more accurate three-dimensional spatial sound source positioning and achieving directional acquisition of multiple sound sources.

The microphone audio acquisition module according to the present disclosure can be integrated with an existing network device conveniently. Thus, in practical application, the mode of adding the microphone audio acquisition module to an existing network device in an acquisition space is often used in order to make the microphone deployment more convenient and flexible. In this mode, a lower cost can be achieved without cables, and the spatial positions for audio signal acquisition are not limited to the same surface and hence are diversified.

The signal processing unit according to the present disclosure can be a powerful processing unit deployed in the wireless network according to practical application to provide a stronger signal processing capability, and can cooperate with other monitoring device such as cameras, to achieve the application for complex dynamic audio and video positioning and monitoring acquisition of multiple sound sources.

DETAILED DESCRIPTION

The embodiments of the present disclosure will be further described in detail with reference to the accompanying drawings.

The present disclosure discloses a large-scale distributed microphone array adopting wireless access. The array includes a plurality of microphone array nodes which are distributed in a space and a wireless network. Each of the plurality of microphone array nodes is provided with one or more microphone audio acquisition modules. The microphone array node is communicatively connected to an external signal processing unit via the wireless network, and uploads, an unprocessed audio signal or an audio signal which is simply processed on the microphone array node, to the signal processing unit to perform audio mixing and other audio signal processing.

The microphone array node acquires audio signals by microphone audio acquisition modules, and wirelessly transmits the acquired audio signals to the signal processing unit. The microphone array node does not further process the acquired audio signals.

Each microphone array node is connected to one or more signal processing units of the wireless network through a wireless transmission module. The signal processing unit may be an independent device in the wireless network or be integrated with other devices in the wireless network, for example, integrated with an access point (AP) in a Wi-Fi wireless network.

Further, the wireless network where the microphone array nodes are located may can adopt 802.11 Wi-Fi communication (for example, Wi-Fi communication or Wi-Fi Internet of Things), Bluetooth wireless communication, Zigbee wireless communication or any wireless network transmission mode. At present, the 802.11 Wi-Fi communication standard is one of the most widely used wireless access technology standards. In the field of Internet of Things, the Wi-Fi Internet of Things access mode is one of the most widely used, low-cost and best extensible Internet of Things access modes. A Wi-Fi network is used as an example in the present disclosure.

Further, the microphone array node further includes a wireless device or an Internet of Things device with any application function. The wireless microphone array node may include any wireless device or Internet of Things device supporting other application functions along with a microphone audio acquisition module, for example, a Wi-Fi light group device along with the microphone module, or a Wi-Fi household Internet of Things device along with the microphone module. The wireless microphone array node may also provide only the function of audio signal acquisition.

Figure 1:
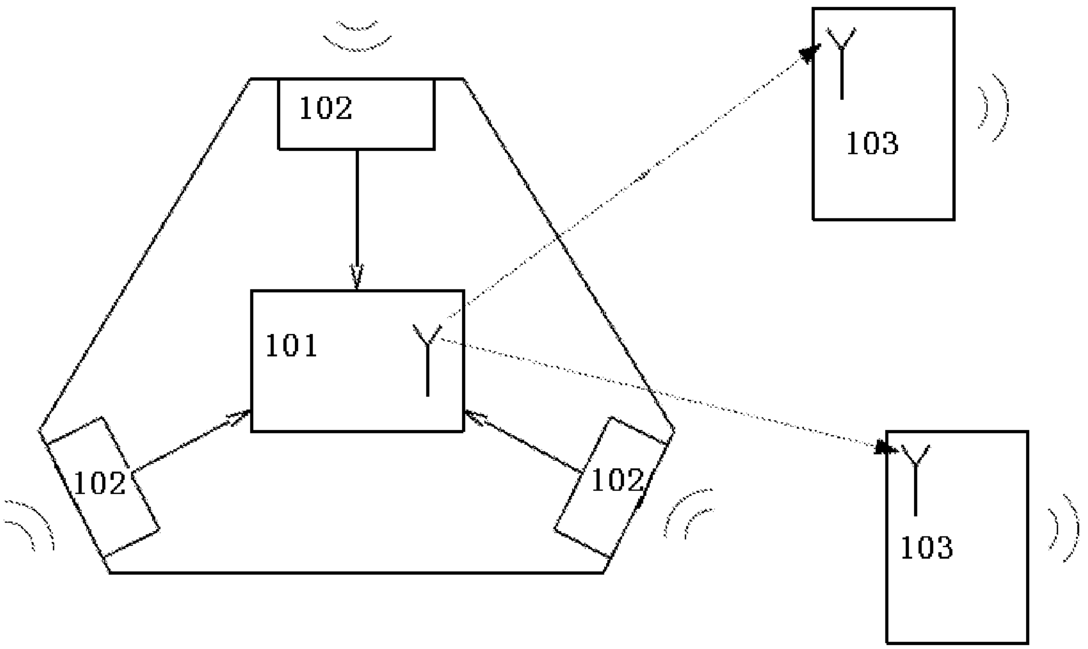
FIG. 1 is a structural view of a small-sized microphone array in the prior art.
Figure 2:
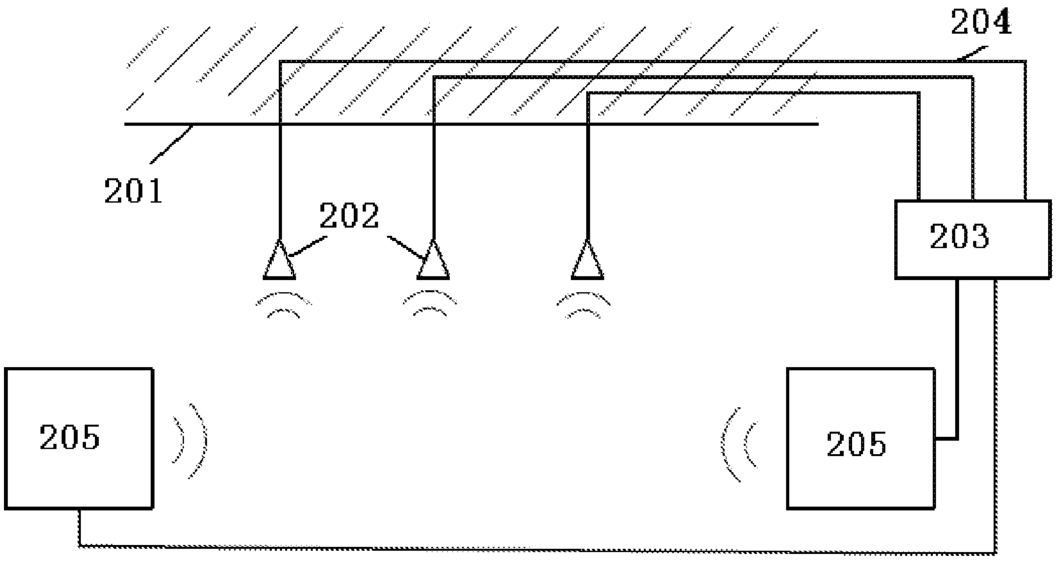
FIG. 2 is a structural view of a suspended microphone array in the prior art.
Figure 3:
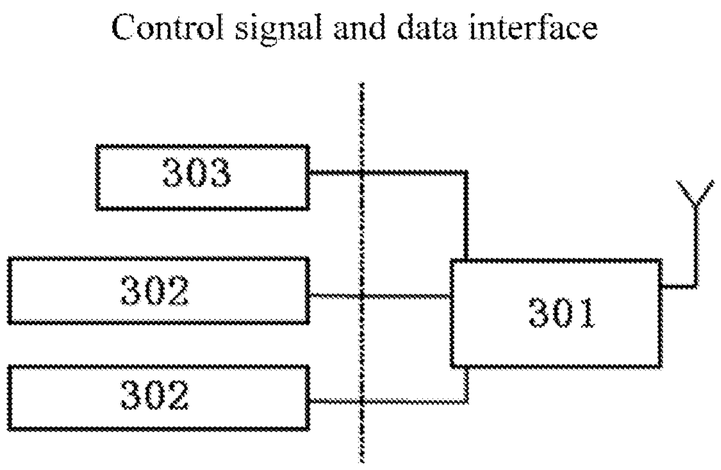
FIG. 3 is a structural view of wireless microphone array nodes according to the present disclosure.

Reference is made to FIG. 3, which is a structural view of microphone array nodes according to an embodiment. The microphone array node includes a wireless transmission and a control module 301, two microphone audio acquisition modules 302 and a function module 303.

The two microphone audio acquisition modules 302 are used for audio signal digital acquisition.

The function module 303 is a device providing any application function, for example, household appliance controlling, lighting controlling and other data acquisition and processing.

The wireless transmission and control module 301 is communicatively connected to the microphone audio acquisition modules 302 and the function module 303 via a control signal and a data interface, and is communicatively connected to an external signal processing unit via a wireless network.

Each wireless microphone array node is connected to one or more signal processing units in the wireless network through the wireless transmission and control module 301.

The microphone audio acquisition modules 302 and the function module 303 are communicatively connected to the wireless transmission and control module 301 through a data interface. The data interface may adopt UART, SPI, I2S, USB, SDIO, I2C, any standard interface, or any non-standard private interface.

The present disclosure further discloses a sound source positioning system to which a distributed microphone array is applicable. The positioning system includes: the above-mentioned distributed microphone array and one or more signal processing units. The distributed microphone array is communicatively connected to the signal processing units via a wireless network.

The distributed microphone array is used for directionally acquiring a single sound source or multiple sound sources.

The signal processing unit is communicatively connected to the distributed microphone array via the wireless network, receives an unprocessed audio signal uploaded by the distributed microphone array or an audio signal which is simply processed on the microphone array node, and performs audio signal processing of audio mixing, noise suppression, echo cancellation or three-dimensional spatial sound source positioning.

The signal processing unit is an independent device in the wireless network, or is integrated in functionality with other device in the wireless network, for example, integrated with an access point (AP) in a Wi-Fi wireless network.

Further, according to practical application, the sound source positioning system can be further provided with an optical monitoring device or other monitoring devices, such as cameras, to achieve the application of complex dynamic audio and video positioning and monitoring acquisition of multiple sound sources.

Figure 4:
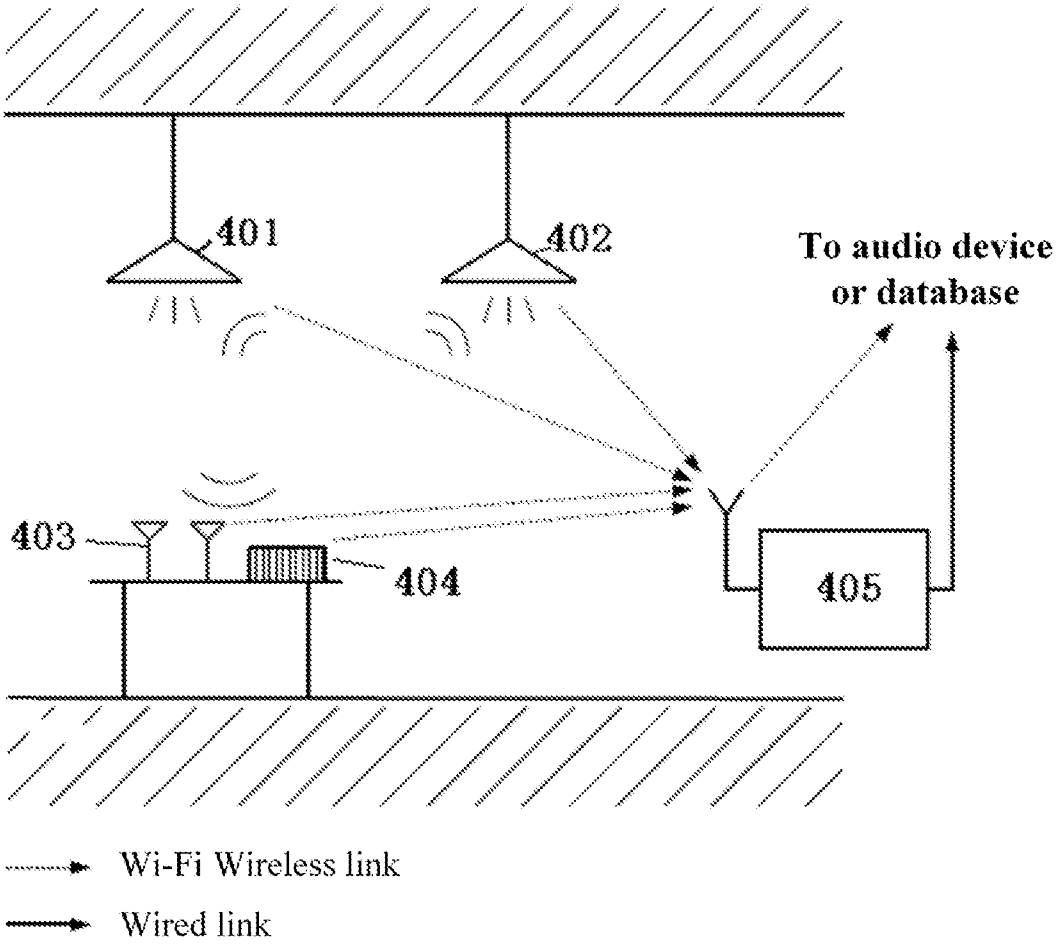
FIG. 4 is a system diagram of a sound source positioning system based on a distributed microphone array according to embodiment one of the present disclosure.

Reference is made to FIG. 4, which illustrates a first embodiment of a sound source positioning system based on a distributed microphone array. The distributed microphone array is a simple wireless microphone array based on Wi-Fi.

The Wi-Fi wireless microphone array includes four wireless microphone array nodes: a first node 401, a second node 402, a third node 403 and a forth node 404.

The first node 401 and the second node 402 each are formed of a Wi-Fi lighting lamp group suspended on the top of the space, which is integrated with a microphone audio acquisition module. The third node 403 is a desktop-type Wi-Fi microphone node in which two audio acquisition modules are provided. The fourth node 404 is a Wi-Fi projector integrated with a microphone audio acquisition module.

An integrated Wi-Fi access point (AP) and signal processing unit 405 is communicatively connected to the first node 401, the second node 402, the third node 403 and the fourth node 404 via a wireless network and is configured for carrying out audio mixing of the audio signals uploaded by the first node 401, the second node 402, the third node 403 and the forth node 404.

The audio signals acquired by the Wi-Fi microphone array nodes are transmitted via Wi-Fi wireless links to the integrated Wi-Fi access point and signal processing unit 405. After performing processing such as echo and noise suppression and signal enhancement by the signal processing unit, the audio signals are transmitted to an audio device to broadcast in real time, or are transmitted to a database for further data processing and storage. Such the transmission can be made via Wi-Fi wireless links or wired links according to the practical application.

Figure 5:
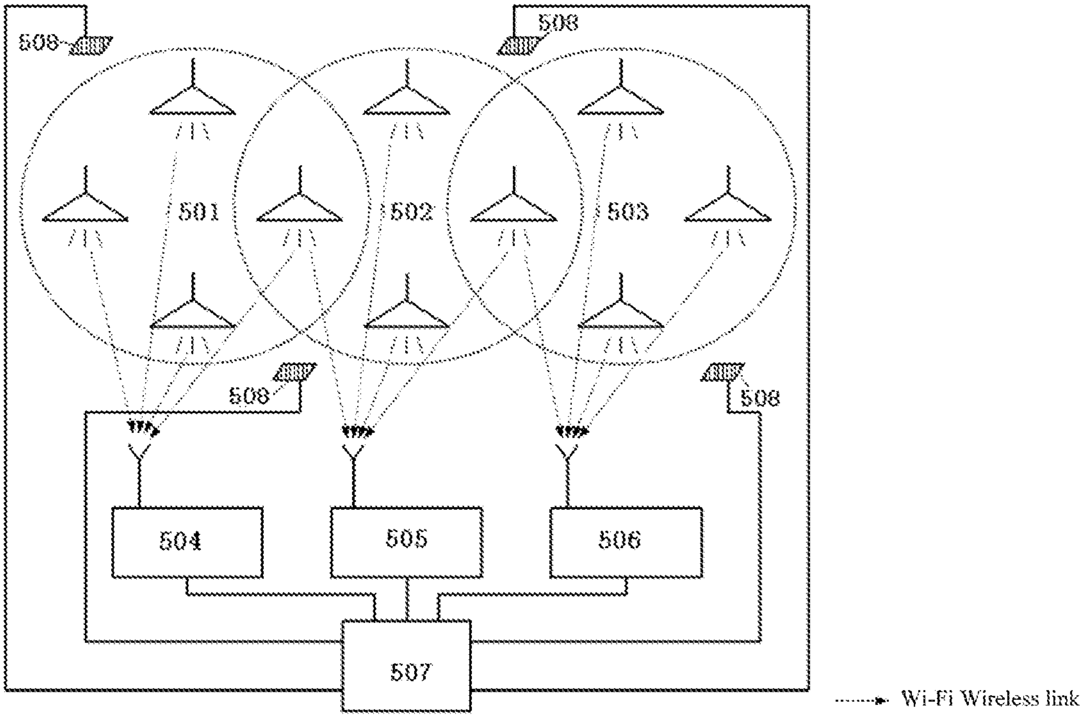
FIG. 5 is a system diagram of a sound source positioning system based on a distributed microphone array according to embodiment two of the present disclosure.

Reference is made to FIG. 5, which illustrates a second embodiment of a sound source positioning system based on a distributed microphone array. Specifically, the system is a large real-time automatic audio and video monitoring system based on a Wi-Fi wireless microphone array. The system includes ten nodes, three integrated Wi-Fi access point and signal processing units wirelessly communicating with the ten nodes, a central signal processing unit and monitoring system communicatively connected to the three Wi-Fi access point and signal processing units, and four cameras communicatively connected to the central signal processing unit and monitoring system.

The system shown by this embodiment may be deployed in a large public area (for example, a shopping center, an open space of a supermarket, a station hall of a railway station, etc.).

The wireless Wi-Fi microphone array in this embodiment includes ten nodes. Each of the ten nodes is formed of a suspended Wi-Fi lighting lamp group integrated with a microphone audio acquisition module. The ten nodes are divided into three node groups (that is, a first node group 501, a second node group 502 and a third node group 503). The first node group 501, the second node group 502 and the third node group 503 correspond to three Wi-Fi access points integrated with signal processing units (that is, a first Wi-Fi access point and signal processing unit 504, a second Wi-Fi access point and signal processing unit 505 and a third Wi-Fi access point and signal processing unit 506), respectively. The first node group 501, the second node group 502 and the third node group 503 overlap with each other, so that two Wi-Fi microphone array nodes are located in two node groups, respectively, in order to increase inputted signal sources, facilitate data processing by the signal processing units, and provide more stable audio acquisition coverage at the borders of the microphone array node groups.

The first Wi-Fi access point and signal processing unit 504, the second Wi-Fi access point and signal processing unit 505 and the third Wi-Fi access point and signal processing unit 506 perform only simple signal processing, such as voice noise suppression, directional signal acquisition, and simple sound source positioning, etc.

A more advanced signal processing and monitoring unit is located at the central signal processing unit and monitoring system 507. Output signals of the three Wi-Fi access point and signal processing units are inputted into the central signal processing unit and monitoring system 507. This system can perform recognition and extraction for multiple sound sources, accurate three-dimensional positioning, speech recognition, sensitive information extraction, monitoring for a sound source video signal flow, and tracking of the specific sound source in a wide range, for example.

The monitoring for the sound source video signal flow means that the monitoring system module performs further video monitoring of one or more specific sound sources according to the audio information processed by the central signal processing unit, and call the cameras 508 near the locations of the sound sources to lock and amplify the sound sources and track and monitor the sound sources in a wide range.

As mentioned above, in a large area monitored by the system, the central signal processing unit and monitoring system 507 can conveniently perform dynamic monitoring of multiple sound sources, that is, Based on acquisition of the recognized information by the microphone array and camera group, audio and video information of sound sources in the area are dynamically acquired to generate dynamic monitoring information flows, which includes:

{audio flow 1, location 1, video flow 1;
audio flow 2, location 2, video flow 2;
. . .
audio flow n, location n, video flow n}.

The content of the above-mentioned dynamic monitoring information flows is dynamically acquired and updated according to a specific algorithm of the processing unit so as to comprehensively monitor the area in real time.

While the content of the present disclosure has been described in detail with reference to the above-mentioned preferred embodiments, the above description is not to be construed as limiting the present disclosure. Various modifications and substitutions are all apparent after those skilled in the art read the above content. Therefore, the scope of protection of the present disclosure is defined by the appended claims.

What is claimed is:

1. A sound source positioning system, comprising:

a distributed microphone array which directionally acquires a single sound source or multiple sound sources, wherein the distributed microphone array comprises: a plurality of microphone array nodes which are deployed in a distributed manner, and a signal processing unit external to the plurality of microphone array nodes, wherein each of the plurality of microphone array nodes is provided with one or more microphone audio acquisition modules, wherein the each of the microphone array nodes is configured to communicatively connect to the signal processing unit via a wireless network, and directly upload to the signal processing unit an unprocessed audio signal;

wherein the signal processing unit is configured to communicatively connect to the distributed microphone array via the wireless network, receive the unprocessed audio signal uploaded by the distributed microphone array, and perform audio signal processing of audio mixing, noise suppression, echo cancellation or three-dimensional spatial sound source positioning; the signal processing unit is integrated with an access point of the wireless network; and a central signal processing unit and monitoring system which is configured to receive output signals of the signal processing unit, and perform recognition and extraction for multiple sound sources, accurate three-dimensional positioning, speech recognition, sensitive information extraction, monitoring for a sound source video signal flow, and tracking of a specific sound source in a wide range.

2. The sound source positioning system according to claim 1, further comprising an optical monitoring device.

3. The sound source positioning system according to claim 1, wherein the wireless network adopts one of the following wireless network transmission modes: 802.11 Wi-Fi communication, Bluetooth communication, and Zigbee Communication.

4. The sound source positioning system according to claim 1, wherein the each of the plurality of microphone array, nodes further comprises a wireless device or an Internet of Things device with at least one application function.

5. The sound source positioning system according to claim 1, wherein the each of the plurality of microphone array nodes further comprises:

a wireless transmission and control module, wherein an input end of the wireless transmission and control module is communicatively connected to the one or more microphone audio acquisition modules, and the wireless transmission and control module is communicatively connected to the signal processing unit via the wireless network; and a function module, which is communicatively connected to the wireless transmission and control module and is a device with at least one application function.

6. The sound source positioning system according to claim 5, wherein the one or more microphone audio acquisition modules and the function module are communicatively connected to the wireless transmission and control module through a data interface; and the data interface comprises one of the following standard interfaces: UART, SPI, I2S, USB, SDIO and I2C.

* * * * *